United States Patent [19]
Glover et al.

[11] Patent Number: 6,023,383
[45] Date of Patent: Feb. 8, 2000

[54] ERROR ESTIMATION CIRCUIT AND METHOD FOR PROVIDING A READ CHANNEL ERROR SIGNAL

[75] Inventors: Kerry C. Glover, Wylie; Davy H. Choi, Garland; Mark A. Wolfe, Dallas; Glenn C. Mayfield, Garland; Jefferson W. Gamble, Plano, all of Tex.

[73] Assignee: Texas Instruments Incorporated, Dallas, Tex.

[21] Appl. No.: 08/828,828

[22] Filed: Mar. 18, 1997

Related U.S. Application Data

[60] Provisional application No. 60/013,690, Mar. 19, 1996.

[51] Int. Cl.[7] .................................................. G11B 5/09
[52] U.S. Cl. .............................. 360/46; 360/65; 360/53; 360/67
[58] Field of Search .................................. 360/46, 65, 53, 360/67; 341/156; 327/323

[56] References Cited

U.S. PATENT DOCUMENTS

| | | | |
|---|---|---|---|
| 5,341,249 | 8/1994 | Abbott et al. | 360/46 |
| 5,400,029 | 3/1995 | Kobayashi | 341/156 |
| 5,602,503 | 2/1997 | Muto | 327/323 |

OTHER PUBLICATIONS

Kenneth Abend and Bruce D. Fritchman, "Statistical Detection for Communication Channels with Intersymbol Interference," *Proceedings of the IEEE*, vol. 58, No. 5, May 1970, pp. 779–785.

G. David Forney, Jr., "Maximum–Likelihood Sequence Estimation of Digital Sequences Estimation of Digital Sequences in the Presence of Intersymbol Interference," *IEEE Transactions on Information Theory*, Vol. IT–18, No. 3, May 1972, pp. 363–378.

G. David Forney, Jr., "The Viterbi Algorithm," *Proceedings of the IEEE*, vol. 61, No. 3, Mar. 1973, pp. 268–278.

Gottfried Ungerboeck, "Adaptive Maximum–Likelihood Receiver for Carrier–Modulated Data–Transmission Systems," *IEEE Transactions on Communications*, vol. Com–22, No. 5, May 1974, pp. 624–636.

Peter Kabal and Subbarayan Pasupathy, "Partial–Response Signaling," *IEEE Transactions on Communications*, vol. Com–23, No. 9, Sep. 1975, pp. 921–934.

C.T. Beare, "The Choice of the Desired Impulse Response in Combined Linear–Viterbi Algorithm Equalizers," *IEEE Transactions on Communications*, vol. Com–26, No. 8, Aug. 1978, pp. 1301–1307.

R.A. Baugh, E.S. Murdock, and B.R. Natarajan, "Measurement of Noise in Magnetic Media," *IEEE Transactions on Magnetics*, vol. MAG–19, No. 5, Sep. 1983, pp. 1722–1724.

Hans Burkhardt and Lineu C. Barbose, "Contributions to the Application of the Viterbi Algorithm," *IEEE Transactions on Information Theory*, vol. IT–31, No. 5, Sep. 1985, pp. 626–634.

Yaw–Shing Tang, "Noise Autocorrelation in Magnetic Recording Systems," *IEEE Transactions on Magnetics*, vol. MAG–21, No. 5, Sep. 1985, pp. 1389–1394.

(List continued on next page.)

*Primary Examiner*—Aristotelis M. Psitos
*Assistant Examiner*—Alan Faber
*Attorney, Agent, or Firm*—W. Daniel Swayze, Jr.; Wade James Brady, III; Richard L. Donaldson

[57] ABSTRACT

A read channel (18) for use in a mass storage system is provided. The read channel (18) includes a plurality of circuit modules circuit and an error estimation circuit (50). The plurality of circuit modules may include circuitry such as a VGA (40), an LPF (42), and an equalizer (48), for conditioning an analog data signal. The plurality of circuit modules receive the analog data signal from a disk/head assembly (12) and condition the signal to generate a digital data signal. The error estimation circuit (50) receives an analog signal from one of the plurality of circuit modules, such as the equalizer (48), and analyzes the analog signal to generate an analog error output signal (94) that is used in the read channel (18) and provided to external circuitry.

6 Claims, 2 Drawing Sheets

OTHER PUBLICATIONS

Roger W. Wood and David A. Petersen, "Viterbi Detection of Class IV Partial Response on a Magnetic Recording Channel," *IEEE Transactions on Communications*, vol. COM–34, No. 5, May 1986, pp. 454–461.

Yaw–Shing Tang, "Noise Autocorrelation in High Density Recording on Metal Film Disks," *IEEE Transactions on Magnetics*, vol. MAG–22, No. 5, Sep. 1986, pp. 883–885.

C. Michael Melas, Patrick Arnett, Irene Beardsley, and Dean Palmer, "Nonlinear Superposition in Saturation Recording of Disk Media," *IEEE Transactions on Magnetics*, vol. MAG–23, No. 5, Sep. 1987, pp. 2079–2081.

Dean Palmer, Pablo Ziperovich, Roger Wood, and Thomas D. Howell, "Identification of Nonlinear Write Effects Using Pseudorandom Sequences," *IEEE Transactions on Magnetics*, vol. MAG–23, No. 5, Sep. 1987, pp. 2377–2379.

Roger Wood, "Jitter vs. Additive Noise in Magnetic Recording: Effects on Detection," *IEEE Transactions on Magnetics*, vol. MAG–23, No. 5, Sep. 1987, pp. 2683–2685.

H.K. Thapar and A.M. Patel, "A Class of Partial Response Systems for Increasing Storage Density in Magnetic Recording," *IEEE Transactions on Magnetics*, vol. MAG–23, No. 5, Sep. 1987, pp. 3666–3668.

Yinyi Lin and Jack K. Wolf, "Combined ECC/RLL Codes," *IEEE Transactions on Magnetics*, vol. 24, No. 6, Nov. 1988, pp. 2527–2529.

Catherine A. French, Anthony D. Weathers, and Jack Keil Wolf, "A Generalized Scheme for Generating and Detecting Recording Channel Output Waveforms with Controlled Pulse Polarity," *IEEE Transactions on Magnetics*, vol. 24, No. 6, Nov. 1988, pp. 2530–2532.

Richard C. Schneider, "Write Equalization for Generalized (d,k) Codes," *IEEE Transactions on Magnetics*, vol. 24, No. 6, Nov. 1988, pp. 2533–2535.

Michael Melas, Patrick Arnett, and Jaekyun Moon, "Noise in a Thin Metallic Medium: The Connection with Nonlinear Behaviour," *IEEE Transactions on Magnetics*, vol. 24, No. 6, Nov. 1988, pp. 2712–2714.

Jaekyun J. Moon and L. Richard Carley, "Partial Response Signaling in a Magnetic Recording Channel," *IEEE Transactions on Magnetics*, vol. 24, No. 6, Nov. 1988, pp. 2973–2975.

F. Dollvo, R. Hermann, and S. Olcer, "Performance and Sensitivity Analysis of Maximum–Likelihood Sequence Detection on Magnetic Recording Channels," *IEEE Transactions on Magnetics*, vol. 25, No. 5, Sep. 1989, pp. 4072–4074.

Roger Wood, "New Detector for 1,k Codes Equalized to Class II Partial Response," *IEEE Transactions on Magnetics*, vol. 25, No. 5, Sep. 1989, pp. 4075–4077.

J.W.M. Bergmans, S. Mita, and M. Izumita, "Characterization of Digital Recording Channels by Means of Echo Cancellation Techniques," *IEEE Transactions on Magnetics*, vol. 25, No. 5, Sep. 1989, pp. 4078–4080.

Yinyi Lin, "An Estimation Technique for Accurately Modelling the Magnetic Recording Channel Including Nonlinearities," *IEEE Transactions on Magnetics*, vol. 25, No. 5, Sep. 1989, pp. 4084–4086.

Anthony D. Weathers, Catherine A. French, and Jack Keil Wolf, "Results on 'Controlled Polarity' Modulation and Coding," *IEEE Transactions on Magnetics*, vol. 25, No. 5, Sep. 1989, pp. 4090–4092.

Catherine A. French, "Distance Preserving Run–Length Limited Codes," *IEEE Transactions on Magnetics*, vol. 25, No. 5, Sep. 1989, pp. 4093–4095.

Lyle J. Fredrickson and Jack Keil Wolf, "Error Detecting Multiple Block (d,k) Codes," *IEEE Transactions on Magnetics*, vol. 25, No. 5, Sep. 1989, pp. 4096, 4098.

Roger Wood, "Enhanced Decision Feedback Equalization," *IEEE Transactions on Magnetics*, vol. 26, No. 5, Sep. 1990, pp. 2178–2180.

Thomas D. Howell, Donald P. McCown, Thomas A. Diola, Yaw–shing Tang, Karl R. Hense, Ralph L. Gee, "Error Rate Performance of Experimental Gigabit Per Square Inch Recording Components," *IEEE Transactions on Magnetics*, vol. 26, No. 5, Sep. 1990, pp. 2298–2302.

Pantas Sutardja, "A Post–Compensation Scheme for Peak–Detect Channel," *IEEE Transactions on Magnetics*, vol. 26, No. 5, Sep. 1990, pp. 2303–2305.

L.L. Nunnelley, M.A. Burleson, L.L. Williams, and I.A. Beardsely, "Analysis of Asymmetric Deterministic Bitshift Errors in a Hard Disk File," *IEEE Transactions on Magnetics*, vol. 26, No. 5, Sep. 1990, pp. 2306–2308.

H.K. Thapar, N.P.Sands, W.L. Abbott, and J.M. Cioffi, "Spectral Shaping for Peak Detection Equalization," *IEEE Transactions on Magnetics*, vol. 26, No. 5, Sep. 1990, pp. 2309–2311.

Lyle J. Fredrickson, "Coding for Maximum Likelihood Detection on a Magnetic Recording Channel," *IEEE Transactions on Magnetics*, vol. 26, No. 5, Sep. 1990, pp. 2315–2317.

Lyle J. Fredrickson, "A (D,K,C)=(0,3,5/2) Rate 8/10 Modulation Code," *IEEE Transactions on Magnetics*, vol. 26, No. 5, Sep. 1990, pp. 2318–2320.

R. Hermann, "Volterra Modeling of Digital Magnetic Saturation Recording Channels," *IEEE Transactions on Magnetics*, vol. 26, No. 5, Sep. 1990, pp. 2125–2127.

Roger Wood, Mason Williams, and John Hong, "Considerations for High Data Rate Recording with Thin–Film Heads," *IEEE Transactions on Magnetics*, vol. 26, No. 6, Nov. 1990, pp. 2954–2959.

Jaekyun Moon and L. Richard Carley, "Performance Comparison of Detection Methods in Magnetic Recording," *IEEE Transactions on Magnetics*, vol. 26, No. 6, Nov. 1990, pp. 3155–3172.

William L. Abbott, John M. Cioffi, and Hemant K. Thapar, "Performance of Digital Magnetic Recording with Equalization and Offtrack Interference," *IEEE Transactions on Magnetics*, vol. 27, No. 1, Jan. 1991, pp. 705–716.

Jan W.M. Bergmans, Seiichi Mita, and Morishi Izumita, "A Simulation Study of Adaptive Reception Schemes for High–Density Digital Magnetic Storage," *IEEE Transactions on Magnetics*, vol. 27, No. 1, Jan. 1991, pp. 717–723.

Ching Tsang and Yaw–Shing Tang, "Time–Domain Study of Proximity–Effect Induced Transition Shifts," *IEEE Transactions on Magnetics*, vol. 27, No. 2, Mar. 1991, pp. 795–802.

K.B. Klaassen, "Magnetic Recording Channel Front–Ends," *IEEE Transactions on Magnetics*, vol. 27, No. 6, Nov. 1991, pp. 4503–4508.

John Hong, Roger Wood, David Chan, "An Experimental 180 Mb/sec PRML Channel for Magnetic Recording," *IEEE Transactions on Magnetics*, vol. 27, No. 6, Nov. 1991, pp. 4532–4537.

Jonathan D. Coker, Richard L. Galbraith, and Gregory J. Kerwin, "Magnetic Characterization using Elements of a PRML Channel," *IEEE Transactions on Magnetics*, vol. 27, No. 6, Nov. 1991, pp. 4544–4548.

L. Richard Carley and John G. Kenney, "Comparison of Computationally Efficient Forms of FDTS/DF Against PR4–ML," *IEEE Transactions on Magnetics*, vol. 27, No. 6, Nov. 1991, pp. 4567–4572.

Jaekyun Moon, "Discrete–Time Modeling of Transition–Noise Dominant Channels and Study of Detection Performance," *IEEE Transactions on Magnetics*, vol. 27, No. 6, Nov. 1991, pp. 4573–4578.

Jack Keil Wolf, "A Survey of Codes for Partial Response Channels," *IEEE Transactions on Magnetics*, vol. 27, No. 6, Nov. 1991, pp. 4585–4589.

Norman L. Koren, "Matched Filter Limits and Code Performance in Digital Magnetic Recording," *IEEE Transactions on Magnetics*, vol. 27, No. 6, Nov. 1991, pp. 4594–4599.

H.M. Hilden, D.G. Howe, and E.J. Weldon, Jr., "Shift Error Correcting Modulation Codes," *IEEE Transactions on Magnetics*, vol. 27, No. 6, Nov. 1991, pp. 4600–4605.

Derek D. Kumar and Bill J. Hunsinger, "ACT–enabled 100MHz Channel Equalizer," *IEEE Transactions on Magnetics*, vol. 27, No. 6, Nov. 1991, pp. 4799–4803.

Alan J. Armstrong and Jack Keil Wolf, "Performance Evaluation of a New Coding Scheme for the Peak Detecting Magnetic Recording Channel," *IEEE Transactions on Magnetics*, vol. 27, No. 6, Nov. 1991, pp. 4804–4806.

S. Raghavan and H.K. Thapar, "Feed–Forward Timing Recovery for Digital Magnetic Recording," *International Conference on Communications Conference Record*, vol. 2, 1991, pp. 794–798.

S.A. Raghavan and H.K. Thapar, "On Feed–Forward and Feedback Timing Recovery for Digital Magnetic Recording Systems," *IEEE Transactions on Magnetics*, vol. 27, No. 6, Nov. 1991, pp. 4810–4812.

James Fitzpatrick and Jack Keil Wolf, "A Maximum Likelihood Detector for Nonlinear Magnetic Recording," *IEEE Transactions on Magnetics*, vol. 27, No. 6, Nov. 1991, pp. 4816–4818.

John G. Kenney, Peter Alexis McEwen, and L. Richard Carley, "Evaluation of Magnetic Recording Detection Schemes for Thin Film Media," *IEEE Transactions on Magnetics*, vol. 27, No. 6, Nov. 1991, pp. 4822–4824.

Pablo A. Ziperovich, "Performance Degradation of PRML Channels Due to Nonlinear Distortions," *IEEE Transactions on Magnetics*, vol. 27, No. 6, Nov. 1991, pp. 4825–4827.

Jaekyun Moon and Jian–Gang Zhu, "Nonlinear Effects of Transition Broadening," *IEEE Transactions on Magnetics*, vol. 27, No. 6, Nov. 1991, pp. 4831–4833.

Jaekyun Moon, "Signal–to–Noise Ratio Degradation with Channel Mismatch," *IEEE Transactions on Magnetics*, vol. 27, No. 6, Nov. 1991, pp. 4837–4839.

R.D. Barndt, A.J. Armstrong, H.N. Bertram, and J.K. Wolf, "A Simple Statistical Model of Partial Erasure in Thin Film Disk Recording Systems," *IEEE Transactions on Magnetics*, vol. 27, No. 6, Nov. 1991, pp. 4978–4980.

Y. Tang and C. Tsang, "A Technique for Measuring Nonlinear Bit Shift," *IEEE Transactions on Magnetics*, vol. 27, No. 6, Nov. 1991, pp. 5316–5318.

R.D. Barndt and J.K. Wolf, "Modeling and Signal Processing for the Nonlinear Thin Film Recording Channel," *IEEE Transactions on Magnetics*, vol. 28, No. 5, Sep. 1992, pp. 2710–2712.

H. Thapar, J. Rae, C. Shung, R. Karabed, and P. Siegel, "On the Performance of a Rate 8/10 Matched Spectral Null Code for Class–4 Partial Response," *IEEE Transactions on Magnetics*, vol. 28, No. 5, Sep. 1992, pp. 2883–2888.

Hamid Shafiee and Jaekyun Moon, "Low–Complexity Viterbi Detection for a Family of Partial Response Systems†," *IEEE Transactions on Magnetics*, vol. 28, No. 5, Sep. 1992, pp. 2892–2894.

Weining Zeng and Jaekyun Moon, "Modified Viterbi Algorithm for a Jitter–dominant 1–$D^2$ Channel," *IEEE Transactions on Magnetics*, vol. 28, No. 5, Sep. 1992, pp. 2895–2897.

William E. Ryan, "Comparative Performance Between Drop–Out Detection and Viterbi Reliability Metric Erasure Flagging,"*IEEE Transactions on Magnetics*, vol. 28, No. 5, Sep. 1992, pp. 2898–2900.

C. Menyennett, L. Botha, and H.C. Ferreira, "A NewRunlength Limited Code for Binary Asymmetric Channels," *IEEE Transactions on Magnetics*, vol. 28, No. 5, Sep. 1992, pp. 2901–2903.

Gang H. Lin, Rick Barndt, H. Neal Bertram, and Jack K. Wolf, "Experimental Studies of Nonlinearities in High Density Disk Recording," *IEEE Transactions on Magnetics*, vol. 28, No. 5, Sep. 1992, pp. 3279–3281.

Ralph Simmons and Robert Davidson, "Media Design for User Density of up to 3 Bits per Pulse Width," *IEEE Transactions on Magnetics*, vol. 29, No. 1, Jan. 1993, pp. 169–176.

Jaekyun Moon and Jian–Gang Zhu, "Nonlinearities in Thin–Film Media and Their Impact on Data Recovery," *IEEE Transactions on Magnetics*, vol. 29, No. 1, Jan. 1993, pp. 177–182.

R.D. Barndt, A.J. Armstrong, and J.K. Wolf, "Media Selection for High Density Recording Channels," *IEEE Transactions on Magnetics*, vol. 29, No. 1, Jan. 1993, pp. 183–188.

Dean C. Palmer and Jonathan D. Coker, "Media Design Considerations for a PRML Channel," *IEEE Transactions on Magnetics*, vol. 29, No. 1, Jan. 1993, pp. 189–194.

Zadian Software, Inc., *Disk Drive Technology*, Copyright 1990, San Jose, CA.

Roy D. Cideciyan, Francois Dolivo, Reto Hermann, Walter Hirt, and Wolfgang Schott, "A PRML System for Digital Magnetic Recording," *IEEE Journal on Selected Areas in Communications*, vol. 10, No. 1, Jan. 1992, pp. 38–56.

Lyle J. Fredrickson, "Viterbi Detection of Matched Spectral Null codes for PR4 Systems," *IEEE Transactions on Magnetics*, vol. 28, No. 5, Sep. 1992, pp. 2889–2891.

K. Chopra and D.D. Woods, "A Maximum Likelihood Peak Detecting Channel," *IEEE Transactions on Magnetics*, vol. 27, No. 6, Nov. 1991, pp. 4819–4821.

Arvind M. Patel, "A New Digital Signal Processing Channel for Data Storage Products," *IEEE Transactions on Magnetics*, vol. 27, No. 6, Nov. 1991, pp. 4579–4584.

Richard C. Schneider, "Sequence (Viterbi–Equivalent) Decoding," *IEEE Transactions on Magnetics*, vol. 24, No. 6, Nov. 1988, pp. 2539–2541.

J.D. Coker, R.L. Galbraith, G.J. Kerwin, J.W. Rae, P.A. Ziperovich, "Implementation of PRML in a Rigid Disk Drive," *IEEE Transactions on Magnetics*, vol. 27, No. 6, Nov. 1991, pp. 4538–4543.

H. Kobayashi and D.T. Tang, "Application of Partial–response Channel Coding to Magnetic Recording Systems," *IBM J. Res. Develop.*, Jul. 1970, pp. 368–375.

ERROR ESTIMATION CIRCUIT AND METHOD FOR PROVIDING A READ CHANNEL ERROR SIGNAL

This application claims benefit of provisional application Ser. No. 60/013,690 filed Mar. 19, 1996.

TECHNICAL FIELD OF THE INVENTION

This invention relates generally to the field of information storage and more particularly to an error estimation circuit and method for providing a read channel error signal.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drive developers continue to evolve and advance the technology. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the HDD control circuitry transfers the data from the DRAM to the located sector of the disk platter through the write channel. The write channel may encode the data so that the data can be more reliably retrieved later. A sector generally has a fixed data storage capacity, such as 512 bytes of user data per sector.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track.

Traditional HDD read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi decoder implementing the Viterbi algorithm, named after Andrew Viterbi who developed it in 1967.

The SSD channel or read channel generally requires mixed-mode circuitry for performing a read operation. During a read operation, the circuitry receives an analog read signal from a preamplifier and amplifies the signal while performing automatic gain control (AGC) to amplify the signal to a known level. Continuous time filtering is performed to remove unwanted noise and to provide waveform shaping. The signal is sampled and equalized to provide an analog signal having discrete values in a sample data domain or discrete time domain. The discrete, equalized signal is then provided to a detector and an error estimation circuit. The detector decodes the signal to provide a digital read signal, while the error estimation circuit estimates an error for use as a feedback signal in timing recovery and gain control. A deserializer circuit then converts the digital read signal from a serial format to a parallel format. In all SSD channels, the major goal during a read operation is to accurately retrieve the data with the lowest bit error rate (BER) in the highest noise environment. The data channel circuitry may be implemented on a single integrated circuit package that contains various input and output (I/O) pins.

Read channels have used "digital" error estimation circuits for calculating error signals corresponding to the difference between actual read signals and target values. The digital error estimation circuits use an analog-to-digital converter (ADC) and a digital-to-analog converter (DAC) to convert signals to and from the digital domain so that the signals may be manipulated in the digital domain. The digital error estimation circuit creates several disadvantages and problems in an SSD channel. For example, to implement the ADC and the DAC requires additional circuitry which increases the overall silicon and size of the SSD channel circuit. The additional circuitry also increases fabrication costs and power consumption. Power consumption is especially critical in portable or battery powered applications such as laptop or notebook computers.

The digital error estimation circuit also suffers the disadvantage-of reducing overall HDD storage capacity. The additional digital circuitry generates circuit delays which reduce or limit the overall bandwidth of the SSD channel. This results in an HDD having a reduced areal density or storage capacity.

SUMMARY OF THE INVENTION

From the foregoing it may be appreciated that a need has arisen for an improved error estimation circuit and method for providing a read channel error signal. In accordance with the present invention, an error estimation circuit and method for providing a read channel error signal is provided which substantially eliminates and reduces the disadvantages and problems of previously developed error estimation circuits such as digital error estimation circuits that require analog-to-digital converters and digital-to-analog converters to convert signals to and from the digital domain. The present invention performs error calculations in the analog domain without ever having to convert to the digital domain thus eliminating the need for the additional conversion circuitry. The elimination of the ADC and DAC circuits reduces overall costs and power consumption while increasing overall HDD storage capacity.

According to the present invention, a read channel for use in a mass storage system is provided. The read channel includes a plurality of circuit modules and an error estimation circuit. The plurality of circuit modules receive an analog data signal from a disk/head assembly in the form of an analog data signal. The plurality of circuit modules of the read channel processing circuit condition the analog data signal to generate a digital data signal. The error estimation circuit receives an analog signal from one of the circuit modules and generates an analog error signal in response.

The present invention provides various technical advantages over previously developed error estimation circuits used in the read channel of a mass storage system. For example, a technical advantage of the present invention includes the ability to analyze an analog or continuous time signal having discrete values to produce an analog error signal without having to convert the analog signal being analyzed into the digital domain. This reduces overall circuitry, silicon area, fabrication costs, and power requirements. Another technical advantage includes increased read channel bandwidth and operational speed resulting in improved HDD storage capacity and performance because of the absence of circuit delays present when converting signals to and from the digital and analog domain. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
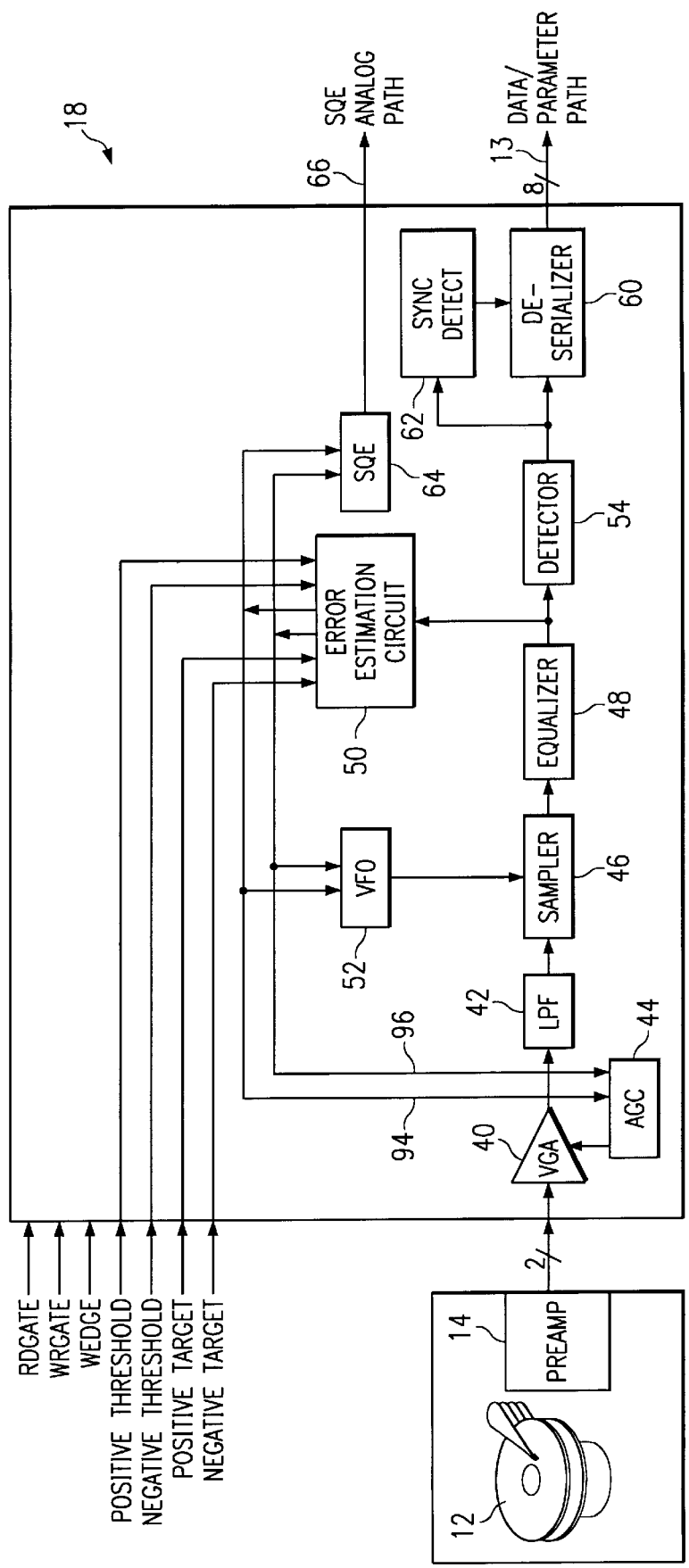
FIG. 1 is a block diagram illustrating a read channel of a mass storage system.

FIG. 1 is a block diagram of read channel 18 of a mass storage system. Read channel 18 includes a variety of circuit modules used to process and condition an analog read signal received from a preamplifier 14 and a disk/head assembly 12 during a read operation. The circuit modules of read channel 18 include a variable gain amplifier (VGA) 40, an automatic gain control (AGC) 44, a low pass filter (LPF) 42, a sampler 46, an equalizer 48, a detector 54, a synchronization detect circuit (sync detect) 62, a deserializer 60, an error estimation circuit 50, a variable frequency oscillator (VFO) 52, and a squared error circuit (SQE) 64. All of these circuit modules of read channel 18 are used during a read operation to perform various functions to condition the analog read signal so that an analog data signal is received at VGA 40 and a corresponding digital data stream is provided at a data/parameter path 13. The digital data is then supplied to control circuitry and ultimately to a host system. The combination or subcombination of all of these plurality of circuit modules may be referred to as a read channel processing circuit. The signals RDGATE, WRGATE, and WEDGE are supplied to read channel 18 and may be accessed by the various circuit modules. A read operation is performed in read channel 18 when the RDGATE signal is enabled. The WRGATE is enabled when a write operation is to be performed in the mass storage system, and the WEDGE signal is enabled when a servo wedge operation is to be performed.

Figure 2:
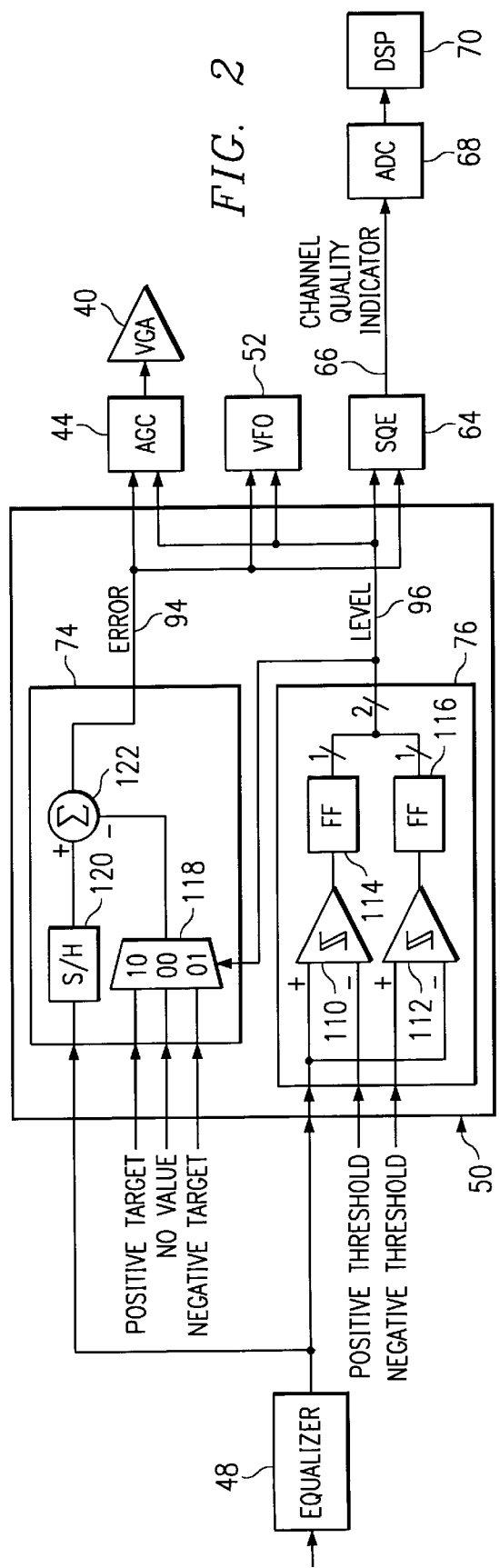
FIG. 2 is a block diagram illustrating an error estimation circuit of the read channel.

VGA 40 receives an analog data signal from preamplifier 14 that originates from disk/head assembly 12. VGA 40, along with AGC 44, work together to provide an appropriate amplification to the analog data waveform needed by read channel 18. AGC 44 receives feedback information from error estimation circuit 50 so that appropriate adjustments can be made in the amplification or gain provided to the analog data signal by VGA 40. Error estimation circuit 50, as shown more fully in FIG. 2, provides an analog error output signal 94 to AGC 44 during sampled or discrete time signal processing. Analog error output signal 94 serves as an input to AGC 44 to assist with establishing the gain of VGA 40.

The amplified analog data signal is provided by VGA 40 to LPF 42 for further processing in read channel 18. LPF 42 receives the amplified analog data signal and filters the signal to remove unwanted high frequency noise. LPF 42 also provides waveform shaping with amplitude boost. LPF 42 may be a continuous time 7th order filter designed using Gm/C components that may be operated in a data mode and a servo mode. The cutoff frequency and boost of LPF 42 may be programmable. The filtered output signal of LPF 42 is provided to sampler 46.

Sampler 46 receives the filtered output signal and synchronously samples the continuous time signal at discrete times. Sampler 46 holds and provides the sampled value until the next sample time to provide a discrete, analog signal. VFO 52 controls sampler 46 by providing a signal indicating when sampler 46 should sample and hold the signal. The output of sampler 46 is a discrete, analog signal having discrete values. Each discrete value corresponds to the value or amplitude of the filtered output signal at the time the signal was sampled by sampler 46. Sampler 46 may be a sample and hold circuit such as a circular sample and hold circuit that is time sequence multiplexed to equalizer 48 so that the correct time sequenced value is presented to equalizer 48.

Equalizer 48 receives the discrete, analog signal from sampler 46 and provides a discrete, equalized signal that is equalized to the target function of detector 54. Equalizer 48 may be a finite impulse response filter or FIR that employs a plurality of filter coefficients or taps to filter the signal. Equalizer 48 includes a plurality of multipliers that each receive one of the filter coefficients and a consecutive output of sampler 46. The outputs of each of the multipliers are then provided to an adder, such as an analog summer, which sums the inputs and serves as the output of equalizer 48. As the input signal to equalizer 48 changes, the consecutive sampler outputs provided to each multiplier is shifted to the next multiplier such that a new discrete, analog value from sampler 46 is provided to the first multiplier and the oldest discrete value from sampler 46 is dropped from the last multiplier.

Equalizer 48 may be a five tap filter with coefficients set by programmable digital circuitry. For example, equalizer 48 may receive five digital coefficients or filter tap weights that are converted to an analog value through a digital-to-analog converter. Each coefficient is then provided to a separate multiplier. The outputs of all five of the multipliers are provided to an analog summer to provide the discrete, equalized signal. The number of coefficients or taps and corresponding multipliers may vary. Equalizer 48 provides the discrete, equalized signal to detector 54 and error estimation circuit 50.

Detector 54 receives the discrete, equalized signal and analyzes the signal to produce a digital data signal corresponding to the data stored on disk/head assembly 12. In one embodiment, detector 54 may be a maximum likelihood detector or Viterbi decoder implementing the Viterbi algorithm. Assuming that detector 54 is implemented as a Viterbi decoder, detector 54 includes an add, compare, and select circuit (ACS), a metric, and a trellis for decoding the signal. The ACS may include programmable operational parameters stored in a storage register. The output of the ACS is provided to the trellis which acts as a logic tree for sequence decoding of the discrete, equalized signal provided by equalizer 48. The trellis provides a digital data signal which serves as the output signal of detector 54.

Sync detect 62 receives the digital data signal and provides a synchronization detect signal. Sync detect 62 searches for the presence of a synchronization byte in the digital data signal and enables the synchronization detect signal when a synchronization byte is detected. Sync detect 62 may search for the synchronization byte over a predefined period or "window" of time that the synchronization byte should be present. Sync detect 62 may include a register for storing a predefined synchronization byte and digital logic circuitry to compare the digital data signal to the predefined synchronization byte.

Deserializer 60 receives the digital data signal and the synchronization detect signal. The digital data signal is provided to data/parameter path 13 in parallel format when the synchronization detect signal is enabled. Deserializer 60 places the digital data in an appropriate parallel format such as an eight or nine-bit format.

Error estimation circuit 50 receives the discrete, equalized signal provided by equalizer 48 and calculates analog error output signal 94 and a two bit digital level estimation signal 96. Analog error output signal 94 it an analog signal indicating how far the equalized signal provided by equalizer 48 differs from an ideal target value. Digital level estimation signal 96 corresponds to the band or level where the value of the discrete, equalized signal of equalizer 48 is located. Analog error output signal 94 and digital level estimation signal 96 are provided to VFO 52, AGC 44, and SQE 64. A positive and negative target value and a positive and negative threshold value are also provided to error estimation circuit 50 for use in calculating analog error output signal 94. Error estimation circuit 50 is illustrated more fully in FIG. 2 and discussed below.

VFO 52 controls the sample time or sample intervals of sampler 46. During a read operation, VFO 52 receives analog error output signal 94 and digital level estimation signal 96 from error estimation circuit 50 and adjusts the frequency of its output signal so that it is in proper phase with the signal provided by equalizer 48. VFO 52, sampler 46, equalizer 48, and error estimation circuit 50 together provide a sampled time phase locked loop function to read channel 18.

SQE 64 receives analog error output signal 94 and digital level estimation signal 96 provided by error estimation circuit 50. SQE 64 provides a squared analog error signal corresponding to the square of analog error output signal 94. This signal serves as a channel quality indicator by demonstrating the equalization being performed by equalizer 48. The squared analog error signal is provided to external processing circuitry through SQE analog path 66. The squared error signal may then be converted to a digital signal by an analog-to-digital converter (ADC) 68 and analyzed by a digital signal processor (DSP) 70. The results of the analysis of the squared error signal may then be used to fine tune or manipulate the various programmable operational parameters of read channel 18 to further enhance performance. The programmable coefficients or operational parameters provided to equalizer 48 may be modified to increase overall read channel performance. For example, during burn-in, known data may be written to disk/head assembly 12 and then read by read channel 18. The squared error signal may then be analyzed to fine tune the operational parameters used in the various circuit modules of read channel 18.

In operation, read channel 18 receives an analog data signal from disk/head assembly 12 through preamplifier 14 when the RDGATE signal is enabled. The enabling of the RDGATE signal indicates that a read operation is to be performed in read channel 18. VGA 40 receives the analog data signal and provides appropriate gain or boost to the analog data signal which is then filtered by LPF 42. AGC 44 provides a gain signal to VGA 40 to establish the appropriate amplification or gain needed by read channel 18. Error estimation circuit 50 provides analog error output signal 94 and digital level estimation signal 96 to AGC 44 corresponding to the error between the discrete, equalized signal of equalizer 48 and a target value.

Sampler 46, under the control of VFO 52, receives the output signal of LPF 42 and samples the signal. Sampler 46 provides a discrete, analog signal to equalizer 48. Equalizer 48 further conditions and equalizes the signal and provides a discrete, equalized signal having the desired channel response for detector 54. Detector 54 receives the discrete, equalized signal from equalizer 48 and analyzes the signal and provides a digital data signal corresponding to the stored data. The digital data signal is provided to deserializer 60 which then places the serial digital signal into parallel format. Deserializer 60 provides the digital data to data/parameter path 13 after sync detect 62 detects a synchronization byte and sends the synchronization detect signal to deserializer 60.

FIG. 2 is a block diagram of error estimation circuit 50 of read channel 18. Error estimation circuit 50 includes a level estimator 76 and an error calculator 74. Level estimator 76 receives the discrete, equalized signal from equalizer 48, a positive threshold value and a negative threshold value. The positive threshold value and the negative threshold value are programmable values that indicate the relative divisions between a positive band, a zero band and a negative band. Level estimator 76 provides digital level estimation signal 96 which indicates whether the value of the discrete, equalized signal provided by equalizer 48 is located in the positive band, the negative band, or the zero band.

Figure 3:
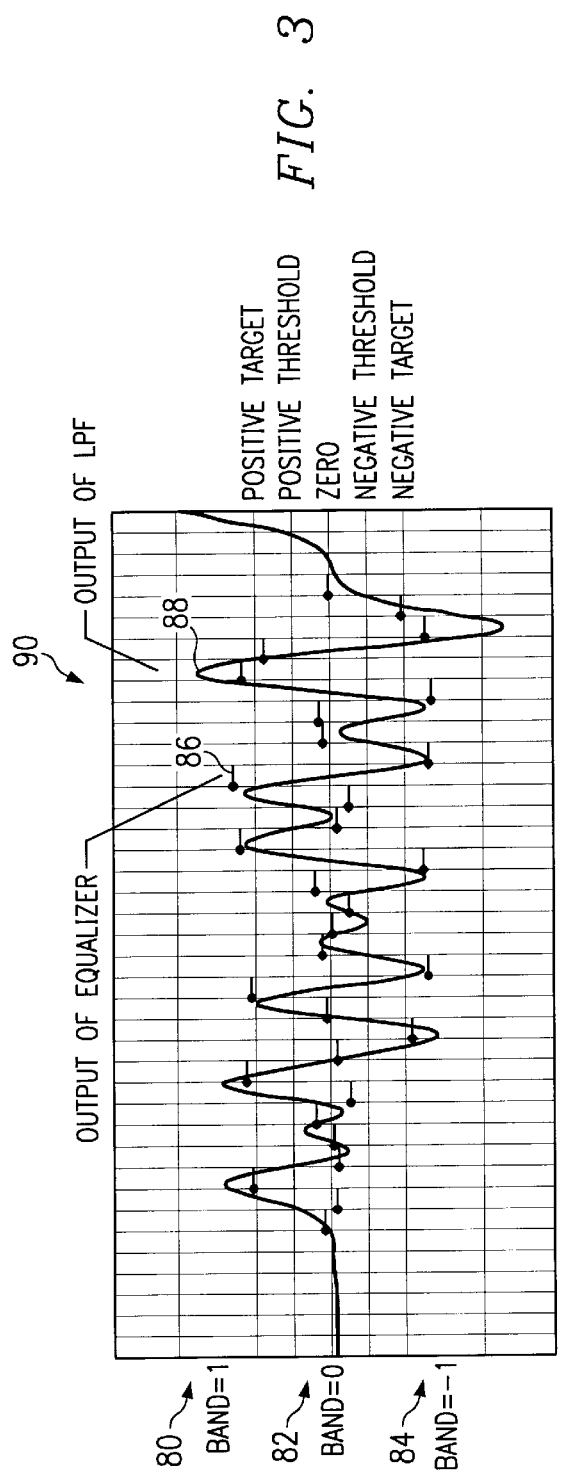
FIG. 3 is a waveform diagram illustrating the equalizer output waveform and the low pass filter output waveform of the read channel.

Level estimator 76 accomplishes this by comparing the discrete value of the discrete, equalized signal to the positive threshold value and the negative threshold value to determine if the discrete value falls above the positive threshold, below the negative threshold, or between the positive threshold and the negative threshold. This may be accomplished in circuitry by using a first comparator 110 to compare the positive threshold to the input signal and a second comparator 112 to compare the negative threshold to the input signal. The results of each of these comparators are provided to a register such as a flip-flop. First comparator 110 provides a digital "one" to flip-flop 114 if the equalized value is greater than the positive threshold value and provides a digital "zero" to flip-flop 114 if the equalized value is less than the positive threshold value. Similarly, second comparator 112 provides a digital "one" to flip-flop 116 if the negative threshold value is greater than the equalized value-and provides a digital "zero" to flip-flop 116 if the negative threshold value is less than the equalized value. The outputs of the registers or flip-flops serve as the output of level estimator 76 and provide the two-bit digital level estimation signal 96. The timing of flip-flops 114 and 116 are controlled by a clock signal not shown in FIG. 2. Although specific circuitry has been shown to perform level or band estimation, level estimation may be performed in a variety of ways employing different circuitry. Level estimator 76 provides digital level estimation signal 96 corresponding to one of the three bands in which the discrete value of the discrete, equalized signal is located. The three bands may also be referred to as levels such as a positive one level, a negative one level, and a zero level. FIG. 3, discussed more fully below, illustrates the three bands or levels. If the output of flip-flop 114 is assumed to be the most significant bit of digital level estimation signal 96, then a value of "10" indicates the positive band, a "00" indicates the zero band, and a "01 indicates a negative band. A value of "11" is an invalid state.

Error calculator 74 receives the same discrete, equalized signal provided by equalizer 48 along with digital level estimation signal 96 provided by level estimator 76. A positive target value and a negative target value are also provided to error calculator 74. The positive target value and the negative target value are programmable values that indicate the desired value of positive and negative discrete, equalized signal values. Error calculator 74 calculates and provides analog error output signal 94 corresponding to the difference between the discrete value of the discrete, equalized signal of equalizer 48 and the target value of the estimated band provided by digital level estimation signal 96. For example, if level estimator 76, through digital level estimation signal 96, estimates that a discrete value of the discrete, equalized signal is located in the positive band, then error calculator 74 responds by calculating an error signal that is the difference between the discrete value and the positive target value. When the discrete value of the discrete, equalized signal is estimated to be located in the negative band, error calculator 74 calculates an error signal equal to the difference between the discrete, equalized value and the negative target value. If level estimator 76 estimates that the discrete value of the discrete, equalized signal is located in the zero band, the error signal is equal to the discrete, equalized value.

The circuitry of error calculator 74 may include any of a variety of circuit elements such as multiplexer 118, sample/hold circuit 120, and analog summer 122. Multiplexer 118 provides either the positive target value, the negative target value, or no value to analog summer 122 depending on the value of digital level estimation signal 96. A value of "10" provides the positive target value, a value of "00" provides no value, and a value of "01" provides a negative target value. Sample/hold circuit 120 receives the discrete, equalized signal and holds its value. Sample/hold circuit 120 provides this value to analog summer 122. Analog summer 122 subtracts the value provided by multiplexer 118 from the output of sample/hold circuit 120 to generate analog error output signal 94.

Error estimation circuit 50 provides two groups of output signals, analog error output signal 94 generated by error calculator 74 and digital level estimation signal 96 generated by level estimator 76. These signals are provided as inputs to other circuit modules of read channel 18 such as AGC 44, VFO 52, and SQE 64. AGC 44 receives the output signals from error estimation circuit 50 and uses them to determine the amount of gain to be supplied to VGA 40. A damping or gain factor may be provided to AGC 44 to provide stability to the gain circuitry and to assist in loop dynamics. Stability may become more important if level estimator 76 is unable to provide an accurate band estimate which then results in an incorrect analog error output signal 94 from error calculator 74. VFO 52 also receives analog error output signal 94 and digital level estimation signal 96 and uses these signals to adjust the frequency of the read clock during read operations. SQE 64 also receives analog error output signal 94 and digital level estimation signal 96 and provides an analog squared error signal. The analog squared error signal may be supplied external to read channel 18 through SQE analog path 66. The analog squared error signal may then be converted to a digital signal and analyzed by a digital signal processor.

In operation, level estimator 76 and error calculator 74 receive the discrete, equalized signal from equalizer 48 during a read operation. Level estimator 76 compares the discrete value of the discrete, equalized signal to the positive threshold value and the negative threshold value. As a result of these comparisons, digital level estimation signal 96 is generated. This two bit signal indicates the band or level where the discrete value of the discrete, equalized signal is located. Digital level estimation signal 96 is provided to error calculator 74 and is provided as an output of error estimation circuit 50.

Error calculator 74 receives digital level estimation signal 96 and calculates analog error output signal 94. Analog error output signal 94 corresponds to the difference between the discrete value of the discrete, equalized signal provided equalizer 48 and the target value of the band in which the discrete value is located. The difference between the discrete values located in the positive band and the positive target value, and the difference between the discrete values located in the negative band and the negative target value determine the error for discrete values in the positive and negative bands. The value of the discrete values located in the zero band determine the error for the discrete values located in the zero band. Digital level estimation signal 96 provides the appropriate band corresponding to the discrete value of the discrete, equalized signal so that the appropriate error calculation just described can be performed. Analog error output signal 94 results from these circuit calculations.

FIG. 3 is a waveform diagram 90 illustrating an analog low pass filter (LPF) output waveform 88 and a discrete, equalized signal 86 that occur during a read operation. Discrete, equalized signal 86 may be the output of equalizer 48, and analog LPF output waveform 88 may be the output of LPF 42. Waveform diagram 90 includes a positive band 80, a zero band 82, and a negative band 84. A positive threshold value and a negative threshold value, like those provided to level estimator 76, are shown along with a positive and a negative target value, like those provided to error calculator 74. Positive band 80 encompasses the values above the positive threshold value; zero band 82 encompasses the values between the positive threshold value and the negative threshold value, and negative band 84 encompasses the values below the negative threshold value.

LPF output waveform 88 is an analog read signal that has been amplified and conditioned by a low pass filter to remove any high frequency noise. LPF output waveform 88 is shown initially in zero band 82 and then extending to positive band 80 and eventually to negative band 84. Discrete, equalized signal 86 is an equalized, discrete analog waveform that is equalized to the target function of a detector, such as detector 54 of read channel 18 shown in FIG. 1. Discrete, equalized signal 86 is initially shown at zero band 82 and then at positive band 80. Discrete, equalized signal 86 is the result of sampling and conditioning of LPF output waveform 88 to provide an equalized signal having discrete values.

An example of the operations performed by error estimation circuit 50 of FIG. 2 can be illustrated by referring to the discrete value of discrete, equalized signal 86 indicated at the reference numeral 86 of FIG. 3. Level estimator 76 compares the discrete value of the discrete, equalized signal to the positive threshold value and the negative threshold value. This comparison results in the determination or estimate that the discrete value is in the positive band since the discrete value is greater than the positive threshold value. Level estimator 76 provides digital level estimation signal 96 indicating that the discrete value is located in the positive band. Error calculator 74 receives digital level estimation signal 96 and subtracts the positive target value from the discrete value to generate analog error output signal 94. Thus demonstrating the method in which error estimation circuit 50 calculates and provides analog error output signal 94 and digital level estimation signal 96.

Thus, it is apparent that there has been provided, in accordance with the present invention, an error estimation circuit and method for providing a read channel error signal that satisfies the advantages set forth above. For example, the present invention uses an error estimation circuit to analyze an analog or continuous waveform to calculate an analog error signal without the need to convert the analog signal to the digital domain. In this manner, additional circuitry needed to convert the analog signal to the digital domain is eliminated resulting in substantial savings. The elimination of the additional circuitry also prevents the introduction of circuit delays. The absence of these circuit delays increases the read channel bandwidth and operational speed resulting in improved HDD storage capacity and speed. Although the preferred embodiment has been described in detail, it should be understood that various changes, substitutions, and alterations can be made herein. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention. While the invention has been particularly shown and described by the foregoing detailed description, it will be understood by those skilled in the art that various other changes in form and detail may be made without departing from the spirit and scope of the invention as defined by the following claims.

What is claimed is:

1. A read channel for use in a mass storage system comprising:

an equalizer operable to receive and process an analog data signal and to generate an equalized signal, the equalizer operable to generate a digital data signal in response therefrom; and an error estimation circuit operable to receive and process a processed analog data signal from said equalizer, and operable to receive a positive threshold value, a negative threshold value, a positive target value and a negative target value, wherein the error estimation circuit includes a level estimator operable to generate a digital level estimation signal, and an error calculator operable to generate the analog error signal and operable to generate the digital level estimation signal corresponding to a positive band, a negative band, and a zero band by comparing a discrete value of the equalized data signal to the positive threshold value and the negative threshold value.

2. The read channel of claim 1 wherein the level estimator receives the positive threshold value, the negative threshold value, and the filtered/equalized data signal, and wherein the error calculator receives the positive target value, the negative target value, the digital level estimation signal, and the filtered/equalized data signal.

3. The read channel of claim 2 wherein the error calculator is operable to generate the analog error signal corresponding to the difference between the discrete value of the equalized data signal and a corresponding target value of the band that is determined by the digital level estimation signal.

4. The read channel of claim 3 wherein the level estimator includes a first comparator circuit operable to compare the discrete value of the filtered/equalized data signal to the positive threshold value and to produce a first digital comparison signal, a second comparator circuit operable to compare the discrete value of the filtered/equalized data signal to the negative threshold value and to produce a second digital comparison signal, and a digital logic circuit operable to receive the first digital comparison signal and the second digital comparison signal and to generate a digital level estimation signal in response.

5. The read channel of claim 3 wherein the error calculator includes a sample and hold circuit operable to sample the discrete value of the filtered/equalized data signal and to provide a discrete data value, a multiplexer operable to receive the digital level estimation signal and to provide the corresponding target value in response, and an adder circuit operable to subtract the target value provided by the multiplexer from the discrete data value provided by the sample and hold circuit.

6. The read channel of claim 3 wherein the positive threshold value, negative threshold value, the positive target value, and the negative target value are programmable.

\* \* \* \* \*